United States Patent [19]

Thomas et al.

[11] Patent Number: 4,511,022

[45] Date of Patent: Apr. 16, 1985

[54] VALVE ARRANGEMENT FOR REGULATING VEHICLE SUSPENSION DAMPING PRESSURES

[75] Inventors: Alan Thomas, Stratford on Avon; Stanley G. Glaze, Brierley Hill, both of England

[73] Assignee: Lucas Industries, England

[21] Appl. No.: 457,576

[22] Filed: Jan. 13, 1983

[30] Foreign Application Priority Data

Jan. 20, 1982 [GB] United Kingdom ................ 8201550

[51] Int. Cl.³ .............................................. F16F 9/20
[52] U.S. Cl. ................................. 188/299; 267/64.28; 280/707
[58] Field of Search .................. 188/279, 285, 299; 267/64.11, 64.28; 280/707, 714

[56] References Cited

U.S. PATENT DOCUMENTS 3,572,363  3/1971  Roach .............................. 188/299 X
4,030,580  6/1977  Glaze ................................. 188/299

FOREIGN PATENT DOCUMENTS 2040510  8/1980  United Kingdom .

*Primary Examiner*—Duane A. Reger
*Attorney, Agent, or Firm*—Andrus, Sceales, Starke & Sawall

[57] ABSTRACT

A valve arrangement for regulating damping pressure on a piston in a vehicle suspension comprises two identical valves in series between opposite sides of the piston. The valves are moved in unison in response to an intermediate pressure between them and by a servo pressure regulated by a further valve which is responsive to the intermediate pressure and to a current signal supplied to a torque motor. The arrangement is a closed system in which damping force is proportional to torque motor current.

7 Claims, 2 Drawing Figures

VALVE ARRANGEMENT FOR REGULATING VEHICLE SUSPENSION DAMPING PRESSURES

It has been proposed, for example in U.S. Pat. No. 4,030,580, to control electrically the damping applied to wheel carriers in a road vehicle, to obtain desired vertical displacement and/or acceleration characteristics of a vehicle body relative to the ground. The aforesaid U.S. patent discloses a hydraulic damping device in which fluid flow between opposite sides of a damper piston is regulated by an electro-hydraulic servo valve and in which operating pressure for the servo valve is obtained from displacement of the damping fluid, whereby no external hydraulic pressure source is required.

It is a disadvantage of the aforesaid prior art device that the servo valve is positioned only in accordance with a controlling electrical current, and is not directly responsive to the pressures on the damper piston. It is required that the force on the damper piston shall be proportional to the controlling current. In the prior art arrangements this result is obtainable only by rendering the controlling current responsive to the sensed damping force, thereby introducing an additional control loop. In the present invention the servo valve is directly responsive to the damping pressure as well as to the controlling current, whereby the aforesaid additional control loop may be dispensed with.

It is an object of the present invention to provide a damping device for a vehicle suspension in which the foregoing advantages are present.

According to the invention there is provided a valve arrangement for regulating the pressures on opposite sides of a damping piston in a vehicle suspension, said valve arrangement comprising two substantially identical valve devices having control elements which are coupled for movement in unison so that the effective flow areas of said devices are substantially equal in all operating positions thereof, said control elements being responsive to a servo pressure signal, and a further valve responsive to a fluid pressure intermediate said valve devices and to an electrical input signal, for regulating said servo pressure signal.

Embodiments of the invention will now be described, by way of example only, and with reference to the accompanying drawings, in which.

Figure 1:
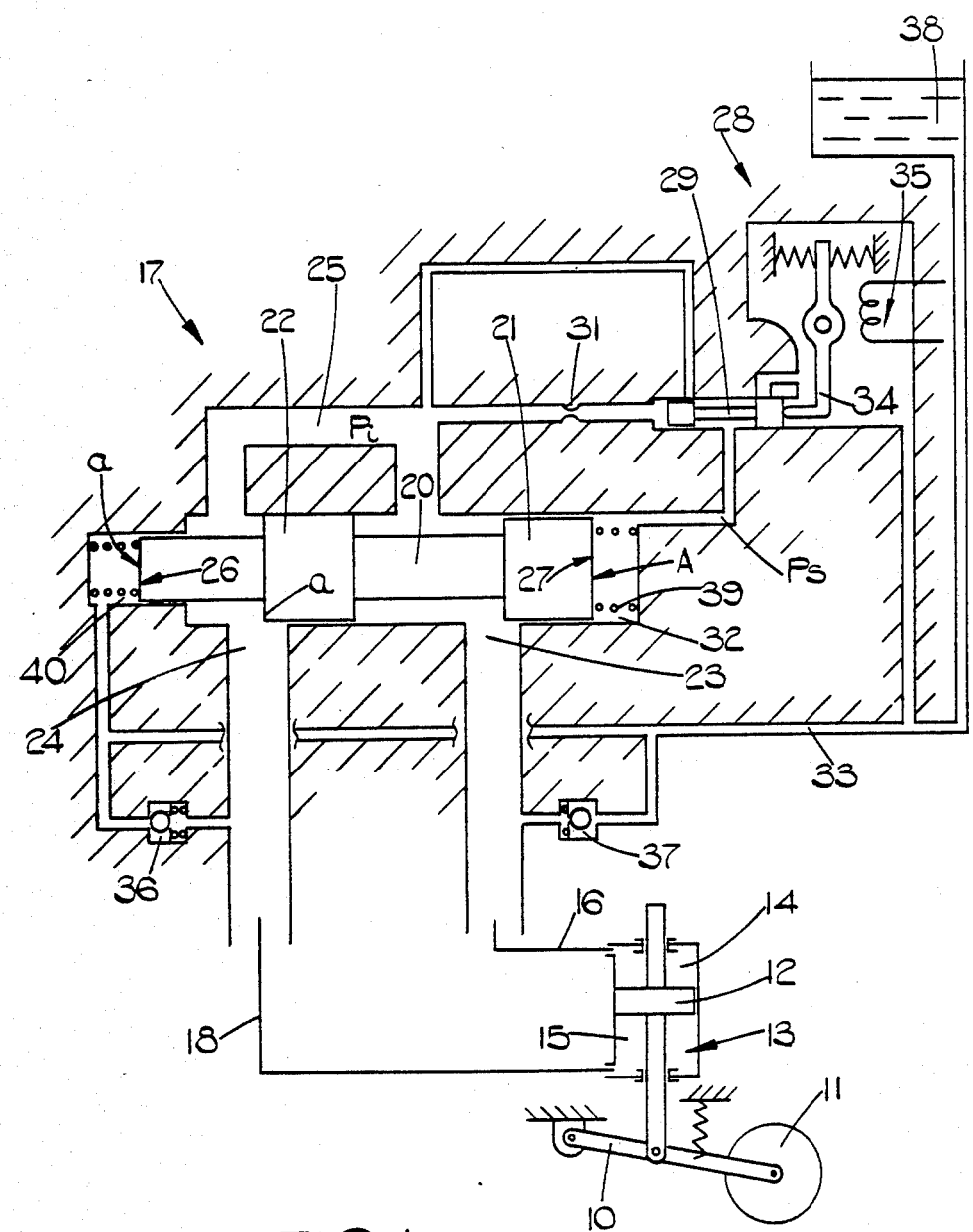
FIG. 1 is a diagram of a vehicle wheel suspension and damping device.

As shown in FIG. 1 a carrier 10 for a vehicle wheel 11 is mounted on a fixed part of the vehicle body and coupled to a piston 12 which is slidable in a cylinder 13. The piston and cylinder 12, 13 act to damp movement of the carrier 10 and wheel 11, and chambers 14, 15 in the cylinder 13 on opposite sides of the piston 12 are interconnected through a passage 16, a valve arrangement 17 and a further passage 18.

The valve arrangement 17 includes a valve spool 20 having two identical lands 21, 22 which co-operate with respective ports 23, 24 to provide two identical valve devices, the arrangement being such that in all positions of the spool 20 the effective flow areas of the ports 23, 24 are equal. The valve device 21, 23 and 22, 24 are interconnected through a passage 25. Ends 26, 27 of the spool 20 have respective cross-sectional areas a, A, such that $A = 2a$. An intermediate pressure Pi in the passage 25 thus acts on the land 22 over an effective area a.

A further, pilot valve 28 includes a valve spool 29 which is subjected to the pressure Pi in the passage 25, through a restrictor 31, an increase in pressure Pi urging the spool 29 to connect a chamber 32 of the spool valve 20 to a low pressure return line 33 and thus to reduce a servo pressure Ps actong on the end 27 of the spool 20. The pilot valve spool 29 is urged against the pressure Pi by a lever 34 acted on by a torque motor 35. The arrangement is such that in equilibrium, when the force on the spool 29 from the torque T of the motor 35 is balanced by the force applied by the pressure Pi, the chamber 32 is isolated from both the pressure Pi and the return pressure in line 33. Non-return valves 36, 37 ensure that the line 33 communicates with whichever of the passages 16, 17 is at the lower pressure. A reservoir 38 communicates with the line 33 and maintains the system full of fluid. Springs 39, 40 maintain the spool 20 in an equilibrium position in the absence of hydraulic pressures thereon.

When the wheel 11 is moving downwardly, as viewed in the drawing, the higher damping pressure PD will exist in the chamber 15 and the passage 18, and a lower pressure PL in the chamber 14 and passage 18. Since the effective flow area of the valve 21, 23 is equal to that of the valve 22, 24 then $$\text{pressure } Pi = (PD + PL)/2 \quad (1)$$

and for equilibrium of the pilot valve 28

$$kT = Pi - PL \quad (2)$$

where k is a factor dependent on the valve geometry and T is the torque exerted by the torque motor 35 and is proportional to the magnitude of the current supply thereto. Since the pressure PL is always very low, being equal to the head of liquid in the reservoir 38, from (1) and (2) above $$kT \approx Pi \approx PD/2 \quad (3)$$

that is, the damping pressure PD is, for practical purposes, proportional to the torque of the motor 35, and hence to its input current.

With a constant torque T from the motor 35, an increase in pressure PD results in an increase in the intermediate pressure Pi applied to the area a of the land 22, and the spool 29 moves rightwards, reducing the pressure Ps and allowing the spool 20 to move rightwards. Flow from the chamber 15 to the chamber 14 increases until the difference between the pressures in these chambers falls. The intermediate pressure Pi also falls to a value consistent with the torque T of the motor 35. In this condition the spool 29 returns to its equilibrium position, and the damping pressure PD is again proportional to the torque T.

It will be apparent that, since the intermediate pressure Pi is, as indicated in equation (1) above, independent of the direction of fluid flow through the valve devices 21, 23 and 22, 24, damping pressure PD will be approximately proportional to the torque T, independently of whether the pressure PD occurs in the chamber 14 or the chamber 15 of the damping cylinder.

It will also be apparent that the damping pressure PD, for either direction of movement of the wheel 11, may readily be varied by means of the torque motor 35.

Figure 2:
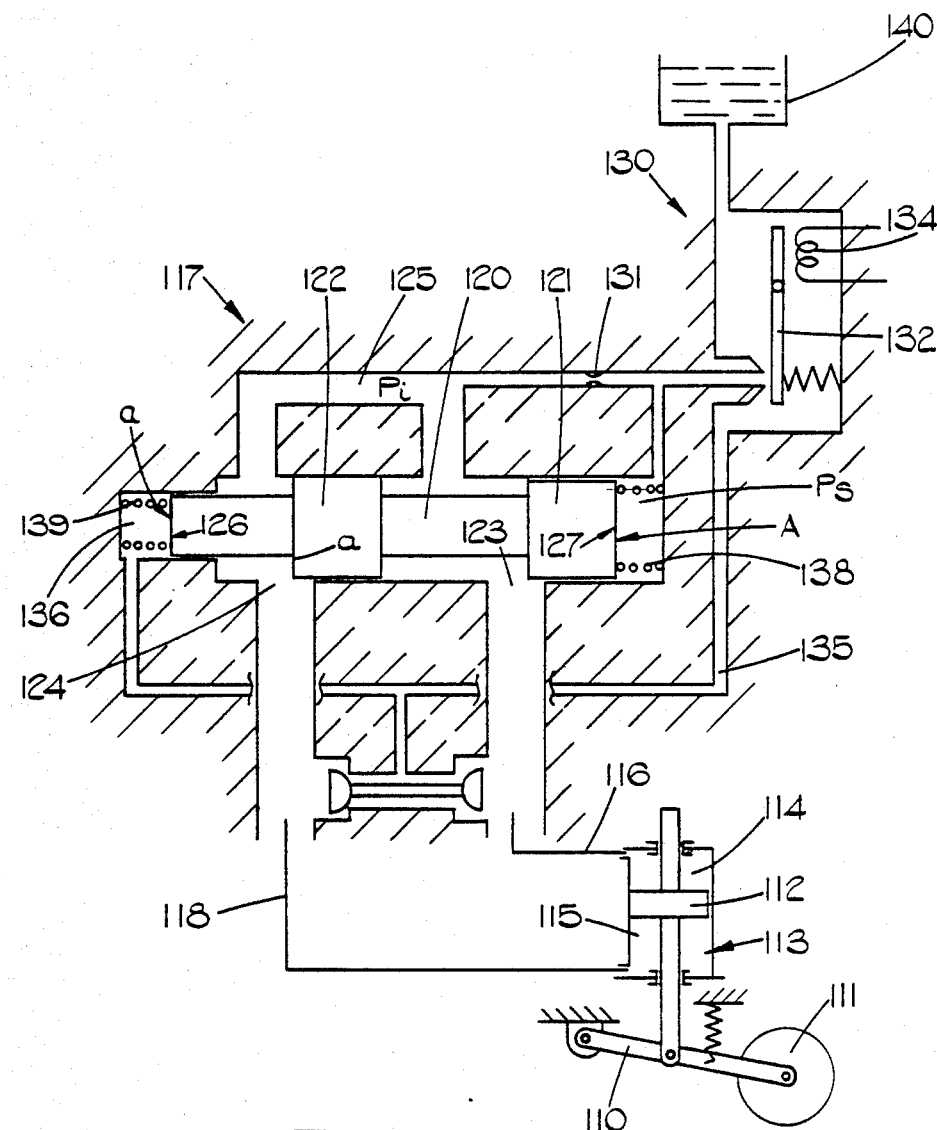
FIG. 2 is a diagram of a modified form of the suspension shown in FIG. 1.

The suspension shown in FIG. 2 is generally similar to that of FIG. 1, but has a flapper control element for its pilot valve instead of a spool.

A carrier 110 for a vehicle 111 is mounted on a fixed part of the vehicle body and coupled to a piston 112 which is slidable in a cylinder 113. The piston and cylinder 112, 113 act to damp movement of the carrier 110 and wheel 111, and chambers 114, 115 in the cylinder 113 on opposite sides of the piston 112 are interconnected through a passage 116, a valve arrangement 117 and a further passage 118.

The valve arrangement 117 includes a valve spool 120 having two identical lands 121, 122 which co-operate with respective ports 123, 124 to provide two identical valve devices, the arrangement being such that in all positions of the spool 120 the effective flow areas of the ports 124, 124 are equal. The valve devices 121, 123 and 122, 124 are interconnected through a passage 125. An end 126 of the spool 120 has a cross-sectional area a and the other end 127 of the spool 120 has a cross-sectional A, such that A=2a. An intermediate pressure Pi in the passage 125 thus acts on the lands 121, 122 over effective areas a in each case.

The passage 125 communicates with a pilot valve 130 through a flow restrictor 131. The end 127 of the spool 120 is subjected to a servo pressure Ps intermediate the valve 130 and restrictor 131. The pilot 130 has a lever control element 132 and a torque motor 134, an increase in torque from the motor 134 urging the element 132 against force applied thereto by the pressure Ps. The downstream side of the valve 130 communicates through a passage 135 with a chamber 136 at the end 126 of the spool 120. A shuttle valve 137 ensures that the pressure PL in the passage 135 is that of the lower of the pressures in the passages 116, 117. Light springs 138, 139 maintain the spool 120 in an equilibrium position in the absence of hydraulic pressures thereon. A reservoir 140 maintains the system full of fluid.

If the wheel 111 is moving downwardly, as viewed in the drawing, then the higher, damping pressure PD will exist in passage 118 and the lower pressure PL in passage 116. As before the effective flow areas of the valves 121, 123 and 122, 124 are equal, and intermediate pressure $$Pi=(PD+PL)/2 \quad (4)$$

In equilibrium of the spool 120 the forces thereon as a result of hydraulic pressure are given by $$a.Pi+a.PL=A.Ps \quad (5)$$

In equilibrium of the element 32 the torque T from the motor 34 is given by $$kT=Ps-PL \quad (6)$$

where k is a factor dependent on the geometry of the valve 130.

Since PL is a very low pressure, corresponding to the head of liquid in the reservoir 140,
from (4) $Pi \approx PD/2$
and from (6) $kT \approx PS$
substituting in (5)
a $PD/2 \approx 2akT$
whereby $PD \approx 4kT$.

So that the damping pressure PD is approximately proportional to the torque T applied by the motor 134.

It will be apparent that, since the intermediate Pi is, as indicated in equation (1) above, independent of the direction of fluid flow through the valve devices 121, 123 and 22, 24, damping pressure PD will be approximately proportional to the torque T, independently of whether the pressure PD occurs in the chamber 114 or the chamber 115 of the damping cylinder.

With the wheel 111 moving downwardly the damping pressure PD will exist in the chamber 115 and passage 118. With a constant torque T from the motor 134, an increase in pressure PD results in an increase in the intermediate pressure Pi applied to the area a of the land 122, and an increase in the servo pressure Ps applied to the area A at the end 127 of the spool 120. Since the pressure Ps is substantially less than the pressure Pi, there is initially no significant movement of the spool 120. However, the increase in pressure Ps moves the element 132 to increase flow through the valve 130, thereby reducing the servo pressure Ps and permitting the spool 120 to move to the right, thereby increasing flow from the chamber 115 to the chamber 114 until the difference between these pressures falls to a value consistent with the torque T of the motor 134. In this condition the control element 132 returns to its original position and the device is once again in equilibrium.

We claim:

1. A valve arrangement for regulating the pressures on opposite sides of a damping piston in a road vehicle suspension, said valve arrangement comprising two identical valve devices in series and connected, in use, between zones on opposite sides of said damping piston, said devices including substantially identical flow control elements which are coupled for movement in unison so that the effective flow areas of the devices are substantially equal to each other in all operating positions of their flow control elements and the fluid pressure intermediate the devices is substantially equal to the arithmetic mean of said pressures on opposite sides of the damping piston, a further valve for regulating a servo pressure in accordance with the magnitude of said intermediate pressure and the magnitude of an electrical input signal, and means for positioning said flow control elements in response to said servo pressure so that, for a given value of said input signal a change in said intermediate pressure causes said servo pressure to move said control elements in a sense to oppose said change, whereby said intermediate pressure, and hence the force acting on said damping piston, is dependent on the magnitude of said electrical input signal.

2. A valve arrangement as claimed in claim 1 which includes passages for connecting said valve devices in series between chambers on opposite sides of said damping piston, and means for returning fluid from said further valve to whichever of said passages is at the lower pressure.

3. A valve arrangement as claimed in claim 1 in which said valve devices comprise lands on a spool, one end of said spool being subjected to said servo pressure, and the other end thereof to said intermediate pressure.

4. A valve arrangement as claimed in claim 1 in which said servo pressure is derived by said further valve from said intermediate pressure.

5. A valve arrangement as claimed in claim 1 in which said further valve comprises a control member responsive to an actuating pressure derived from said intermediate pressure, and a torque motor for urging said control member against said actuating pressure.

6. A valve arrangement as claimed in claim 5 in which said control member comprises a spool whose opposite ends are acted upon by said actuating pressure and said torque motor.

7. A valve arrangement as claimed in claim 5 in which said control member comprises a lever urged in respective opposite directions by said servo pressure and by said torque motor.

* * * * *